United States Patent
Baumgartner et al.

(10) Patent No.: US 6,463,412 B1
(45) Date of Patent: Oct. 8, 2002

(54) HIGH PERFORMANCE VOICE TRANSFORMATION APPARATUS AND METHOD

(75) Inventors: Jason Raymond Baumgartner; Steven Leonard Roberts; Nadeem Malik; Flemming Andersen, all of Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/464,847

(22) Filed: Dec. 16, 1999

(51) Int. Cl.[7] .......................... G10L 13/00; G10L 15/00
(52) U.S. Cl. ........................ 704/246; 704/261; 704/269
(58) Field of Search ................................ 704/235, 246, 704/258, 260, 261, 266, 267, 268, 269, 270, 270.1

(56) References Cited

U.S. PATENT DOCUMENTS

| | | | | |
|---|---|---|---|---|
| 5,915,237 A | * | 6/1999 | Boss et al. .................. | 704/258 |
| 5,933,805 A | * | 8/1999 | Boss et al. .................. | 704/249 |
| 6,151,576 A | * | 11/2000 | Warnock et al. ............. | 704/260 |
| 6,173,250 B1 | * | 1/2001 | Jong ........................... | 704/269 |
| 6,247,015 B1 | * | 6/2001 | Baumgartner et al. ....... | 707/101 |
| 6,336,092 B1 | * | 1/2002 | Gibson et al. ............... | 704/207 |

* cited by examiner

Primary Examiner—Marsha D. Banks-Harold
Assistant Examiner—Martin Lerner
(74) Attorney, Agent, or Firm—Duke W. Yee; Mark E. McBurney; Stephen J. Walder, Jr.

(57) ABSTRACT

A high performance voice transformation apparatus and method is provided in which voice input is transformed into a symbolic representation of phonemes in the voice input. The symbolic representation is used to retrieve output voice segments of a selected target speaker for use in outputting the voice input in a different voice. In addition, voice input characteristics are extracted from the voice input and are then applied to the output voice segments to thereby provide a more realistic human sounding voice output.

32 Claims, 3 Drawing Sheets

HIGH PERFORMANCE VOICE TRANSFORMATION APPARATUS AND METHOD

BACKGROUND OF THE INVENTION

1. Technical Field

The present invention is directed to an apparatus and method for high performance voice transformation. In particular, the present invention is directed to an apparatus and method for transforming an input voice into an output voice different from the input voice while maintaining some voice characteristics between the input voice and the output voice.

2. Description of Related Art

Voice recognition devices are generally known in the art of voice technologies. With voice recognition devices, a user speaks into a microphone and the voice recognition device recognizes words and phrases from the user's speech. These recognized words and phrases may then be used, for example, to generate textual messages on a computer display.

Voice synthesis is also generally known in the art. With voice synthesis, textual messages are input to a voice synthesis device which then synthesizes the text into a speech output. Voice synthesis devices are limited in the quality of the output speech due to their objective manner of analyzing the textual messages. Thus, the speech that is output by the voice synthesis device typically has a mechanical quality to it and does not accurately reflect human speech patterns.

Moreover, with the increased use of computer games and, in particular, modem or networked video games, the ability to speak with other players during play has been emphasized. The current video game technology is limited to conversing with other players through typed messages or by way of using ones own digitized speech.

With this latter manner of communicating, if a player has a speech impediment or a thick accent, other players may find it difficult to communicate with him/her. Furthermore, players may find it more enjoyable to speak in a voice other than their own, such as a character in the video game which they are playing.

Thus, it would be advantageous to have an apparatus and method that may transform an input voice into a different output voice while maintaining some of the characteristics of the input voice to more closely resemble actual human speech.

SUMMARY OF THE INVENTION

The present invention provides a high performance voice transformation apparatus and method. The voice transformation apparatus includes a controller, an input device interface, an input voice characteristic extraction device, a voice recognition device, a voice dictionary interface, and a speech output generator.

The input device interface provides a communication pathway to a voice input device. The voice input from the voice input device is provided to the voice transformation apparatus, which responds with the controller instructing the input voice characteristic extraction device to extract voice characteristics from the voice input.

At the same time as the input voice characteristic extraction is being performed, or before or after the input voice characteristic extraction is performed, the controller instructs the voice recognition device to perform voice recognition functions on the voice input. The voice recognition functions include breaking down the voice input into symbolic representations of the phonemes that make up the voice input, which are then forwarded to the voice dictionary interface.

The voice dictionary interface provides a communication pathway to one or more voice dictionaries. The voice dictionaries consist of an array of symbolic representations for phonemes associated with a target speaker output speech pattern segment. The voice dictionary interface "looks-up" target speaker output speech pattern segments based on the symbolic representations of the phonemes from the input voice pattern.

The target speaker output speech pattern segments are forwarded to the speech output generator which generates the output speech signals that are then transformed into output by the output device. The speech output generator generates the output speech signals by using the target speaker output speech pattern segments forwarded by the voice dictionary interface and applying the voice input characteristics extracted from the voice input by the input voice characteristic extraction device.

In the case that some sounds in the voice input may not be recognized, the voice recognition device may forward the unrecognized segment of the voice input to the speech output generator without performing a voice dictionary look-up function. In this way, the voice input segment that is not recognized may be output by the output device rather than performing an erroneous look-up of an output voice pattern segment.

In addition, to provide a more graceful transition between the output voice pattern segments and the voice input segments which could not be recognized, in the output of the output device, the voice input segment that was not recognized may have voice pattern characteristics of the selected voice dictionary speaker applied to it. These voice pattern characteristics of the selected voice dictionary speaker may be obtained from the voice dictionary as a default setting.

Thus, with the present invention, a user may input his/her voice and designate a different output voice from his/her own to be used for outputting transformed speech. Furthermore, the output voice may more closely resemble actual human speech because the characteristics of the user's input voice pattern are applied to the output voice. Thus, the output voice will use the same voice fluctuations, same pitch, volume, etc. as that of the user.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein like numerals designate like elements, and wherein:

FIG. 3 is an exemplary diagram of a voice dictionary according to the present invention;

DETAILED DESCRIPTION OF THE PREFERRED EMBODIMENT

Figure 1:
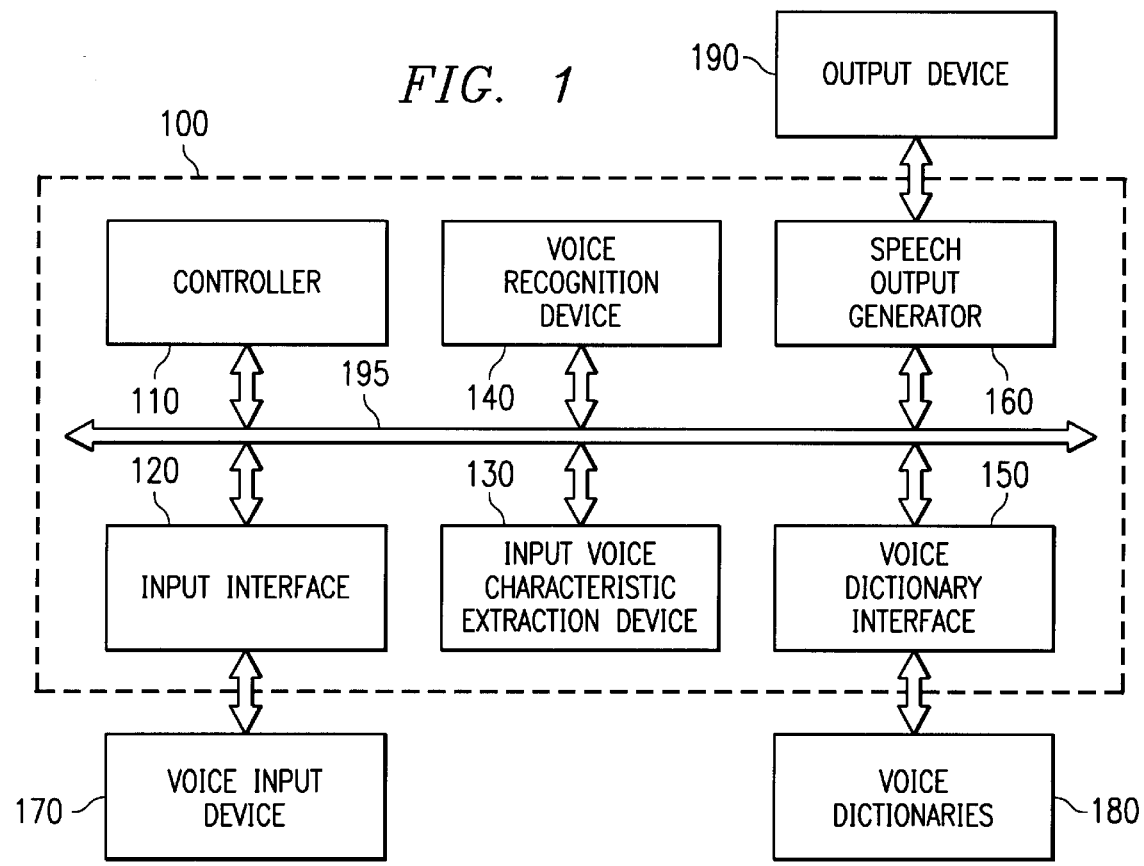
FIG. 1 is an exemplary block diagram illustrating a voice transformation apparatus according the present invention.

FIG. 1 is an exemplary block diagram of a voice transformation apparatus 100 according to the present invention. As shown in FIG. 1, the voice transformation apparatus 100 includes a controller 110, an input device interface 120, a input voice characteristic extraction device 130, a voice recognition device 140, a voice dictionary interface 150, and a speech output generator 160.

The above elements 110–160 may be, for example, hardware components of a data processing system that are dedicated to performing the voice transformation apparatus 100 functions hereafter described. Alternatively, the above elements 110–160 may be embodied in software executed by a programmable processing device.

The elements 110–160 are in communication with one another over control/signal bus 195. Although a bus architecture is shown in FIG. 1, the invention is not limited to such an embodiment. Rather, any type of architecture capable of facilitating communication among the elements 110–160 may be used without departing from the spirit and scope of the invention.

The input device interface 120 provides a communication pathway to a voice input device 170. The voice input device 170 may be, for example, a microphone or other audio pick-up device that is capable of converting speech into analog or digital signals. If the voice input device 170 transforms speech into analog signals, an A/D converter (not shown) may be used to convert the analog signals into digital signals for processing by the voice transformation apparatus 100.

Alternatively, the voice input device 170 may be a storage medium upon which a voice print is stored. For example, the voice input device 170 may be a CD-ROM, a hard disk, a floppy disk, a magnetic tape, or the like, on which a voice is stored as an audio file, such as a .WAV file. In short, any type of device capable of inputting voice data into the voice transformation apparatus 100 is intended to be within the spirit and scope of the present invention.

The voice input from the voice input device 170 is input to the voice transformation apparatus 100 via the input interface 120. In response to receiving the voice input from the voice input device 170, the controller 110 instructs the input voice characteristic extraction device 130 to extract voice characteristics from the voice input. Such characteristics include, for example, speech volume, pitch, pause lengths, and the like. These characteristics are preferably normalized to account for variations amongst a plurality of speakers and thereby capture correct voice characteristics.

The extraction of voice characteristics by the input voice characteristic extraction device 130 may be performed, for example, through digital filtering techniques. For example, filtering may obtain speech volume characteristic information by determining the normalized amplitudes of the input voice pattern for a plurality of samplings. Methods other than filtering to extracting voice characteristics from an input voice pattern may be utilized without departing from the spirit and scope of the present invention.

At the same time as the input voice characteristic extraction is being performed, or before or after the input voice characteristic extraction is performed, the controller 110 instructs the voice recognition device 140 to perform voice recognition functions on the input voice pattern. The voice recognition device 140 may make use of a trained neural network for recognizing speech segments from a voice input. The voice recognition device 140 may be trained through repeated use of training phrases such that the neural network learns the manner in which a user speaks. Thus, even if the user has a speech impediment, the neural network of the voice recognition device 140 may accommodate him/her.

The voice recognition functions performed by the voice recognition device 140 include extracting the symbolic phoneme-based content of the input voice pattern. Phonemes are a speech utterance, such as "k," "ch," and "sh," that is used in synthetic speech systems to compose words for audio output. The voice recognition device 140 breaks down the input voice pattern into symbolic representations of the phonemes that make up the input voice pattern which are then forwarded to the voice dictionary interface 150.

The voice dictionary interface 150 provides a communication pathway to one or more voice dictionaries 180. The voice dictionaries 180 consist of an array of symbolic representations for phonemes associated with a target speaker output speech pattern segment. The voice dictionary interface 150 "looks-up" target speaker output speech pattern segments based on the symbolic representations of the phonemes from the input voice pattern. Thus, for each symbolic representation, a target speaker output speech pattern segment is retrieved from one of the voice dictionaries 180.

The target speaker output speech pattern segments may be representative of a speaker other than the speaker of the input voice pattern. Thus, by using the present voice transformation apparatus 100, a speaker of the input voice pattern may change his/her voice using the voice dictionary such that the speaker maintains anonymity. Additionally, if the user of the voice transformation apparatus 100 has a speech impediment, the target speaker output speech pattern segments may provide a speech output that is free of the speech impediment. Furthermore, the speaker may utilize the voice transformation apparatus 100 for entertainment purposes to provide a voice output different from his/her own.

The target speaker output speech pattern segments are forwarded to the speech output generator 160 which generates the output speech signals that are then transformed into output by the output device 190. The speech output generator 160 generates the output speech signals by using the target speaker output speech pattern segments forwarded by the voice dictionary interface 150 and applying the input voice characteristics extracted from the input voice pattern. In this way, the characteristics, such as the pitch, volume, pause lengths, and the like, of the input voice pattern may be utilized to provide a more realistic speech output. The application of the input voice characteristics extracted from the input voice pattern may be performed using digital filtering techniques, for example.

As noted above, the voice dictionaries 180 may include one or more voice dictionaries. These voice dictionaries 180 may be incorporated with the voice transformation apparatus 100, for example, in a plug-and-play manner. Thus, the voice dictionaries 180 may be provided as data on an integrated circuit (IC) card, a floppy disk, a CD-ROM, a game cartridge, or any other type of storage medium which may be "plugged into" the voice transformation apparatus 100 or otherwise loaded into the voice transformation apparatus 100. In addition, the voice dictionaries 180 may be made available for download from one or more servers on a network, such as the Internet.

When a plurality of voice dictionaries 180 are being used, the user may select which dictionary is to be used for outputting speech. The selection may be performed, for example, through a user interface (not shown) associated with the voice transformation apparatus 100. Based on the user's selection, the appropriate voice dictionary may be activated. Alternatively, based on the user's selection, the symbolic representations forwarded from the voice recognition device 140 to the voice dictionary interface 150 may include an identifier indicating which voice directory 180 to utilize.

Thus, if a user wishes his/her output speech to resemble, for example, a celebrity such as Arnold Schwartzenegger, the user may select a first voice dictionary. If the user wishes to have output speech resemble a cartoon character such as Bugs Bunny, for example, a second voice dictionary may be selected.

The above description of the voice transformation apparatus 100 assumes that the voice recognition device 140 may accurately identify all of the sounds in the input voice pattern. However, this may not always be the case. In the case that some sounds in the input voice pattern may not be recognized, the voice recognition device 140 may forward the unrecognized segment of the input voice pattern to the speech output generator 160 without performing a voice dictionary look-up function. In this way, the input voice pattern segment that is not recognized may be output by the output device 190 rather than performing an erroneous look-up of an output voice pattern segment.

In addition, to provide a more graceful transition between the output voice pattern segments and the input voice pattern segments which could not be recognized, the input voice pattern segment that was not recognized may have voice pattern characteristics of the selected voice dictionary speaker applied to it. These voice pattern characteristics of the selected voice dictionary speaker may be obtained from the voice dictionary as a default setting. In this way, if, for example, the voice dictionary speaker has a low tone voice, the unrecognized input voice pattern segment may be modified to more closely resemble the output voice pattern segments.

Additionally, some sounds that are input via the voice input device 170 may not be speech at all, i.e. a horn being blown. In the event that a non-speech sound is received, the voice transformation apparatus 100 may forward the non-speech sound to the output device 190 without performing voice transformation processing on the non-speech sound. The voice recognition device 140 may be trained such that it may recognize non-speech sounds and will not attempt to convert these non-speech sounds into symbolic representations.

The above processing of input voice patterns into output speech patterns is preferably performed in a streaming manner. Thus, as voice input is received, the voice transformation apparatus 100 performs the voice transformation processing on those portions of voice input received and outputs the speech output as the processing is completed. In this way, a more real-time transformation of voice input into speech output may be performed.

With the present invention, a user may input his/her voice and designate a different output voice from his/her own to be used for outputting transformed speech. Furthermore, the output voice may more closely resemble actual human speech because the characteristics of the user's input voice pattern are applied to the output voice. Thus, the output voice will use the same voice fluctuations, same pitch, volume, etc. as that of the user.

Figure 2:
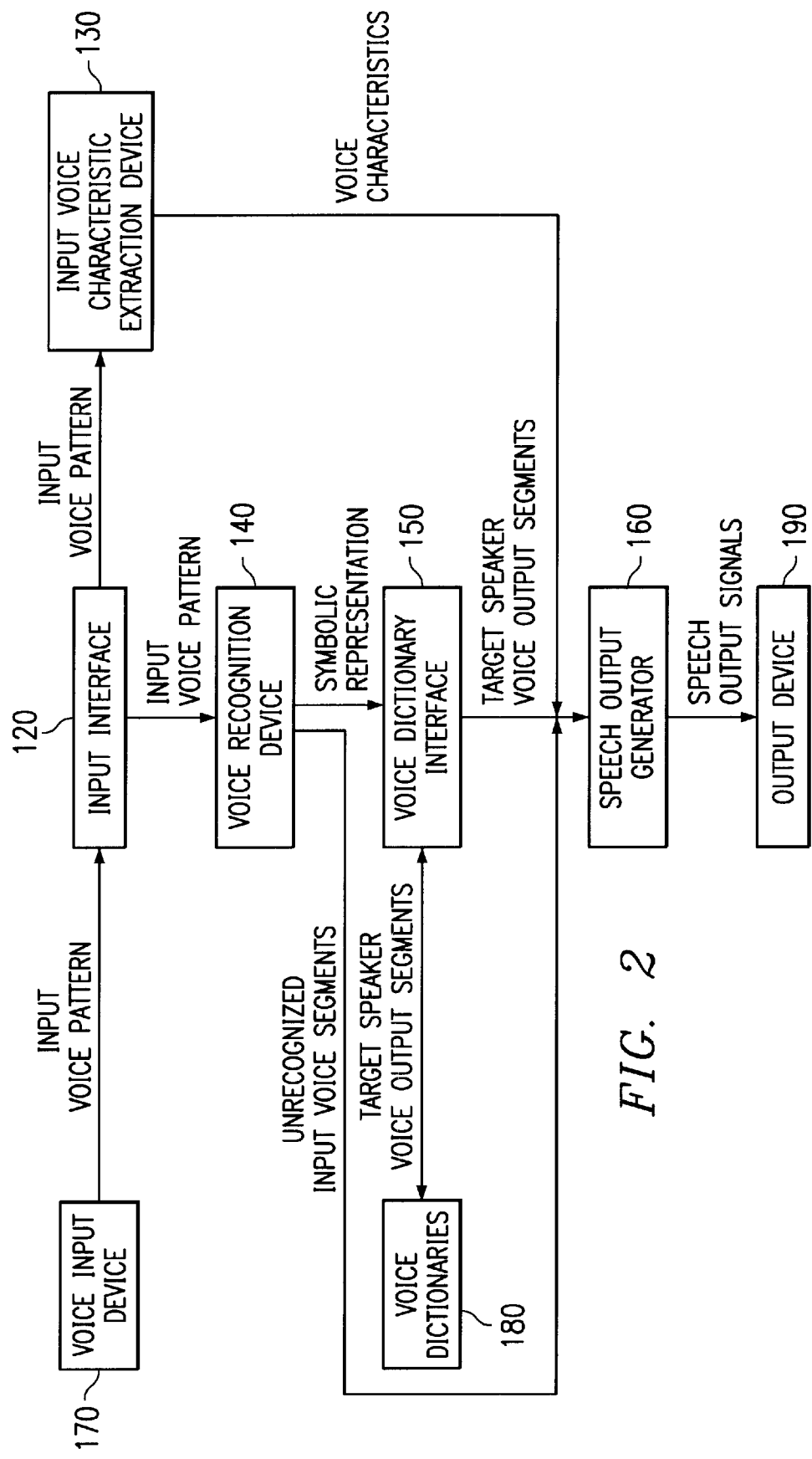
FIG. 2 is an exemplary data flow diagram according to the present invention.

FIG. 2 is an exemplary data flow describing the interaction among the elements of FIG. 1. As shown in FIG. 2, the voice input device 170 receives voice input from a user, converts the voice input to an input voice pattern and forwards the input voice pattern to the input interface 120. The voice recognition device 140 and the input voice characteristic extraction device 130 then process the input voice pattern. As noted above, although FIG. 2 depicts this processing being done simultaneously, the voice recognition device 140 may perform its functions before or after the input voice characteristic extraction device 130 performs its functions.

The voice recognition device 140 then transforms segments of the input voice pattern into symbolic representations of the phonemes that make up the input voice pattern segments. Unrecognized input voice pattern segments are passed to the speech output generator 160 without further voice recognition processing.

The symbolic representation of the phonemes is forwarded to the voice dictionary interface 150 which performs a look-up in the voice dictionary 180 to find target speaker voice output segments corresponding to the phonemes. The target speaker voice output segments are then forwarded to the speech output generator 160 along with the voice characteristics extracted by the input voice characteristic extraction device 130.

The speech output generator 160 applies the voice characteristics to the target speaker voice output segments and outputs speech output signals to the output device 190. The output device 190 then produces an output corresponding to the speech output signals. The output may take the form of audio output signals or may be, for example, data signals that are to be used by a remote device for outputting audio output signals.

Thus, with the present invention, voice input may be transformed into a different voice output. During the transformation, the user's voice characteristics are maintained and used to provide a more realistic synthesized human speech output.

FIG. 3 is an exemplary diagram of a voice dictionary 180 according to the present invention. As shown in FIG. 3, the voice dictionary 180 may include two or more fields. Field 310 includes symbolic representations of input voice pattern phonemes. Field 320 includes target speaker voice output segments. Thus, by performing a search of field 310 using the symbolic representation received from the voice recognition device 140, the voice dictionary interface 150 may retrieve associated target speaker voice output segments from field 320. Additional fields may be included in the voice dictionary 180 in accordance with the present invention.

Although a simple database structure is shown to represent the voice dictionary 180, more complex and more efficient manners of representing the correlation between the symbolic representations in field 310 and the target speaker voice output segments may be employed with this invention. For example, a two-level hierarchical dictionary similar to that described in co-pending and commonly assigned U.S. patent application Ser. No. 09/148,828, which is hereby incorporated by reference, may be used with the present invention. In such a two-level dictionary, a top-level key into the dictionary may be a symbolic representation of a phoneme or other phonic symbol from the input voice pattern. The second level keys may be a series of keys for instantaneous audio samples of a target speaker's voice.

The two-level dictionary may be created by having a target speaker speak a predefined set of sentences comprising an entire set of phonemes in the target speaker language. The target speaker's speech is then dissected into phonemes, each phoneme being comprised of one or more instantaneous samples from the target speaker's speech. Preferably, the instantaneous samples are normalized so that the sample is monotonic. This helps to eliminate unwanted voice characteristics, such as any pitch rising due to a question being asked.

Each instantaneous sample is given a second level key and its value (the sample itself) is stored in a second-level dictionary. Each phoneme is stored in a top-level dictionary with corresponding second-level keys of the instantaneous samples of the target speaker's speech that make up the phoneme.

A look-up of a top level phoneme in the top level dictionary thereby returns an appropriate sequence of second level keys, each second level key being translated via the second level dictionary into its corresponding sample. The natural redundancy of a person's voice will likely result in much reuse/repetition of instantaneous samples. Thus, the size of the second-level dictionary may be minimized by making use of the same instantaneous sample for reproduction of different phonemes and the like. Other methods and devices for storing information representing a correlation between symbolic representations of phonemes and target speaker voice output segments may be used without departing from the spirit and scope of the present invention.

Figure 4:
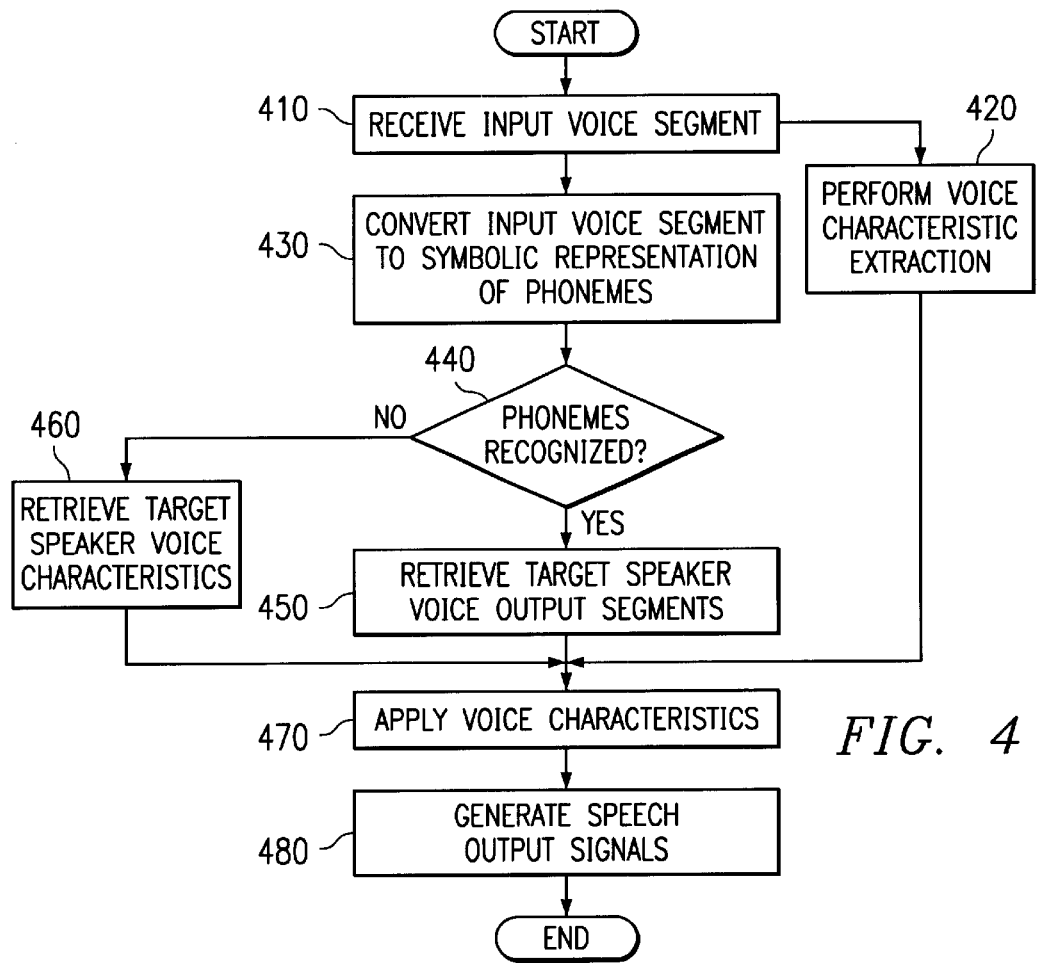
FIG. 4 is a flowchart outlining an exemplary operation of the voice transformation apparatus according to the present invention.

FIG. 4 is a flowchart outlining an exemplary operation of the voice transformation apparatus 100. As shown in FIG. 4, the operation starts with the controller 110 receiving an input voice segment from a voice input device 170 (step 410). The controller 110 instructs the input voice characteristic extraction device 130 to extract voice characteristics from the input voice segment (step 420).

Either before, after, or at the same time as the voice characteristic extraction process is performed, the controller 110 instructs the voice recognition device 140 to perform voice recognition and convert the input voice segment to a symbolic representation of phonemes (step 430). If the voice recognition device 140 is able to convert the input voice segment into corresponding symbolic representations of phonemes (step 440:YES), the controller 110 instructs the voice dictionary interface 150 to retrieve target speaker voice output segments (step 450). Otherwise, if the voice recognition device 140 is unable to convert the input voice segment into corresponding symbolic representations of phonemes (step 440:NO), the controller 110 instructs the voice dictionary interface 150 to retrieve target speaker voice characteristics from the voice dictionary 180 (step 460).

The controller 110 then instructs the speech output generator 160 to apply the voice characteristics to the target speaker voice output segments (step 470). The voice characteristics may be, for example, the voice characteristics extracted by the input voice characteristic extraction device 130 and/or the target speaker voice characteristics retrieved by the voice dictionary interface 150. Which is used depends on whether or not the voice recognition device 140 was able to convert the input voice segment into a symbolic representation.

The speech output generator 160 then generates speech output signals which are output to the output device 190 (step 480). While FIG. 4 shows the operation for a single input voice segment, it should be appreciated that this process may be repeated for each input voice segment.

Figure 5:
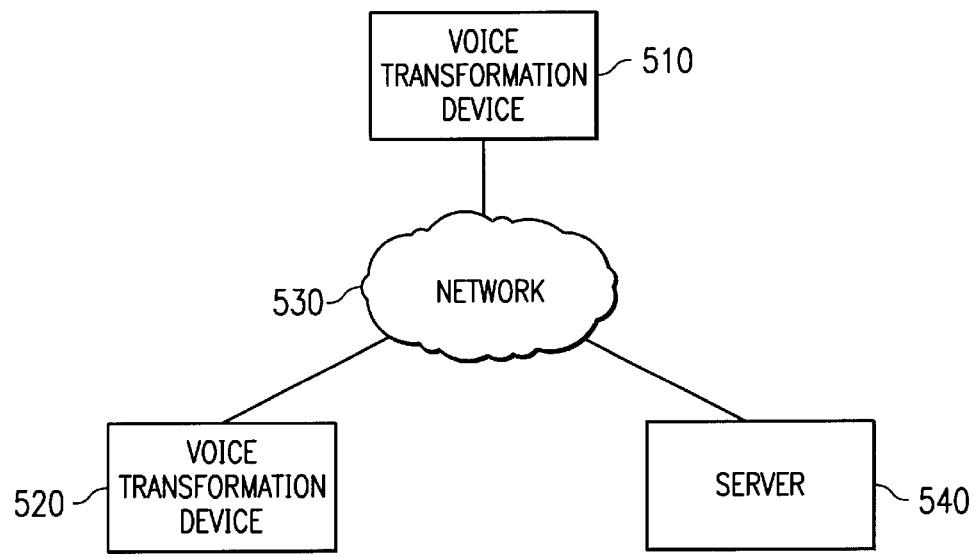
FIG. 5 is an exemplary block diagram of a network system in which the present invention may be implemented.

The above embodiments of the present invention have assumed that the voice transformation apparatus 100 is an integrated apparatus, however, the invention is not limited to such embodiments. FIG. 5 shows an exemplary system 500 in which the present invention may be employed. As shown in FIG. 5, the system 500 includes two user devices 510 and 520, at least one network 530, and a server 540. The user devices 510 and 520 may be any computerized device capable of performing the voice transformation functions. The network may be any type of network that facilitates the transmission of data from one device to another. In a preferred embodiment, the network 530 is the Internet.

Portions of the voice transformation apparatus 100 may be distributed among each of the devices 510, 520 and 540. Each device 510, 520 and 540 may have one or more of the elements of the voice transformation apparatus 100 and may perform the corresponding functions.

For example, the user devices 510 and 520 may each make use of a corresponding voice transformation apparatus 100. When a first party, using user device 510, wishes to communicate with a second party, using user device 520, in a different voice from his/her own voice, the first party may select the desired voice using the user device 510 (thereby selecting a corresponding voice dictionary). The first party may then speak into a voice input device associated with the user device 510 and a voice transformation apparatus associated with the user device 510 may extract voice characteristics and perform voice recognition on the first party's speech input.

The resulting symbolic representation of phonemes, the voice characteristic data, and an identifier of the selected voice dictionary may then be transmitted to the user device 520. Upon receipt, this data is used by a voice dictionary interface to retrieve corresponding voice output segments. The voice output segments along with the voice characteristic data is then provided to a speech output generator associated with user device 520 and speech output signals are thereby generated. The second party may respond, in kind, making use of his/her voice transformation apparatus in a similar manner.

Alternatively, the user devices 510 and 520 may not include any of the elements of the voice transformation apparatus 100 or only certain portions of the voice transformation apparatus 100. Rather, the server 540 may perform all or some of the voice transformation apparatus 100 functions. With such an embodiment, the first party may speak into a voice input device associated with the user device 510 and have the voice input digitized and transmitted to the server 540. The server 540 may then perform the appropriate voice transformation apparatus 100 functions on the received voice input data and send the speech output signals to the user device 520. Any manner of distributing the elements of the voice transformation apparatus 100 across a plurality of devices coupled via a network may be used without departing from the spirit and scope of the present invention.

Thus, the present invention provides an improved method, apparatus and computer implemented instructions for transforming one voice into another voice in real time. The mechanism of the present invention avoids mechanical and monotonic qualities of presently available systems. This advantage is provided through identifying input voice characteristics and using these characteristics to modify target speaker output voice segments to more closely resemble human speech fluctuations. Thus, with the real time transformation of one voice into another voice, the present invention may be used in various applications, such as, for example, networked video games, speech translation from one language to another language, reducing accents, and educational tools.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method of transforming a voice input into a voice output of a target speaker, comprising:
    receiving the voice input;
    extracting voice input characteristics from the voice input;
    identifying voice input segments in the voice input;
    identifying voice output segments of the target speaker corresponding to the voice input segments;
    applying the voice input characteristics to the voice output segments of the target speaker to obtain output segments;
    outputting the output segments;
    identifying portions of the voice input that cannot be identified as voice input segments; and
    outputting the portions of the voice input that cannot be identified as voice input segments;
    wherein outputting the portions of the voice input that cannot be identified as voice input segments includes identifying target speaker output voice characteristics; and
    applying the target speaker output voice characteristics to the portions of the voice input that cannot be identified as voice input segments.

2. The method of claim 1, wherein extracting voice input characteristics from the voice input includes filtering the voice input for the voice input characteristics.

3. The method of claim 1, wherein the voice input characteristics include at least one of volume, pitch and pause length.

4. The method of claim 1, wherein extracting voice input characteristics from the voice input and identifying voice input segments in the voice input are performed at a same time.

5. The method of claim 1, wherein the voice input segments are at least one of words and phonemes.

6. The method of claim 1, wherein identifying voice output segments of the target speaker corresponding to the voice input segments includes retrieving voice output segments of the target speaker from a voice dictionary.

7. The method of claim 1, wherein identifying voice output segments of the target speaker corresponding to the voice input segments includes retrieving voice output segments of the target speaker from one of a plurality of voice dictionaries.

8. The method of claim 7, wherein identifying voice output segments of the target speaker corresponding to the voice input segments further includes identifying one of the plurality of voice dictionaries from which the voice output segments of the target speaker are retrieved based on a user selection.

9. A voice transformation apparatus for transforming a voice input to a voice output of a target speaker, comprising:
    a voice input device interface that receives the voice input;
    a voice input characteristic extraction device that extracts voice input characteristics from the voice input;
    a speech recognition device that identifies voice input segments in the voice input;
    a voice dictionary interface that identifies voice output segments of the target speaker corresponding to the voice input segments; and
    an output device that applies the voice input characteristics to the voice output segments of the target speaker to obtain output segments and outputs the output segments;
    wherein the speech recognition device identifies portions of the voice input that cannot be identified as voice input segments, and wherein the output device outputs the portions of the voice input that cannot be identified as voice input segments;
    wherein the output device identifies target speaker output voice characteristics and applies the target speaker output voice characteristics to the portions of the voice input that cannot be identified as voice input segments prior to outputting the portions of the voice input that cannot be identified as voice input segments.

10. The apparatus of claim 9, wherein the voice input characteristic extracting device extracts voice input characteristics from the voice input by filtering the voice input for the voice input characteristics.

11. The apparatus of claim 9, wherein the voice input characteristics include at least one of volume, pitch and pause length.

12. The apparatus of claim 9, wherein the voice input characteristic extraction device extracts voice input characteristics from the voice input and the speech recognition device identifies voice input segments in the voice input at a same time.

13. The apparatus of claim 9, wherein the voice input segments are at least one of words and phonemes.

14. The apparatus of claim 9, wherein the voice dictionary interface identifies voice output segments of the target speaker corresponding to the voice input segments by retrieving voice output segments of the target speaker from a voice dictionary.

15. The apparatus of claim 9, wherein the voice dictionary interface identifies voice output segments of the target speaker corresponding to the voice input segments by retrieving voice output segments of the target speaker from one of a plurality of voice dictionaries.

16. The apparatus of claim 15, wherein the voice dictionary interface identifies one of the plurality of voice dictionaries from which the voice output segments of the target speaker are retrieved based on a user selection.

17. A computer program product in a computer readable medium for transforming a voice input into a voice output of a target speaker, comprising:

first instructions for extracting voice input characteristics from the voice input;

second instructions for identifying voice input segments in the voice input;

third instructions for identifying voice output segments of the target speaker corresponding to the voice input segments;

fourth instructions for applying the voice input characteristics to the voice output segments of the target speaker to obtain output segments; and fifth instructions for outputting the output segments;

sixth instructions for identifying portions of the voice input that cannot be identified as voice input segments; and seventh instructions for outputting the portions of the voice input that cannot be identified as voice input segments;

wherein the seventh instructions include instructions for identifying target speaker output voice characteristics and instructions for applying the target speaker output voice characteristics to the portions of the voice input that cannot be identified as voice input segments.

18. The computer program product of claim 17, wherein the first instructions include instructions for filtering the voice input for the voice input characteristics.

19. The computer program product of claim 17, wherein the voice input characteristics include at least one of volume, pitch and pause length.

20. The computer program product of claim 17, wherein the first instructions and the second instructions are executed at a same time.

21. The computer program product of claim 17, wherein the voice input segments are at least one of words and phonemes.

22. The computer program product of claim 17, wherein the third instructions include instructions for retrieving voice output segments of the target speaker from a voice dictionary.

23. The computer program product of claim 17, wherein the third instructions include instructions for retrieving voice output segments of the target speaker from one of a plurality of voice dictionaries.

24. The computer program product of claim 23, wherein the third instructions further include instructions for identifying one of the plurality of voice dictionaries from which the voice output segments of the target speaker are retrieved based on a user selection.

25. A system for transforming a voice input into a voice output of a target speaker, comprising:

a first device;

a second device; and a network coupled to both the first device and the second device, wherein the first device receives the voice input, converts the voice input into a symbolic representation of voice input segments, extracts voice input characteristics from the voice input, and transmits the symbolic representation of voice input segments and the voice input characteristics across the network to the second device, and wherein the second device identifies target speaker output segments corresponding to the symbolic representation of voice input segments, applies the voice input characteristics to the target speaker output segments to produce the voice output, and outputs the voice output;

wherein the first device identifies portions of the voice input that cannot be identified as voice input segments, and wherein the first device transmits the portions of the voice input that cannot be identified as voice input segments to the second device via the network;

wherein the second device identifies target speaker output voice characteristics, applies the target speaker output voice characteristics to the portions of the voice input that cannot be identified as voice input segments, and outputs the portions of the voice input that cannot be identified as voice input segments.

26. The system of claim 25, wherein the first device extracts voice input characteristics from the voice input by filtering the voice input for the voice input characteristics.

27. The system of claim 25, wherein the voice input characteristics include at least one of volume, pitch and pause length.

28. The system of claim 25, wherein the first device extracts voice input characteristics from the voice input and converts the voice input into a symbolic representation of voice input segments at a same time.

29. The system of claim 25, wherein the voice input segments are at least one of words and phonemes.

30. The system of claim 25, wherein the second device identifies target speaker output segments corresponding to the symbolic representation of voice input segments by retrieving target speaker output segments from a voice dictionary.

31. The system of claim 25, wherein the second device identifies target speaker output segments corresponding to the symbolic representation of voice input segments by retrieving target speaker output segments from one of a plurality of voice dictionaries.

32. The system of claim 31, wherein the first device identifies one of the plurality of voice dictionaries from which the voice output segments of the target speaker are retrieved based on a user selection and transmits an identifier of the one of the plurality of voice dictionaries to the second device via the network.

* * * * *